BYRON M COLE
FREDERIK KERKHOF
INVENTORS.

April 8, 1952 B. M. COLE ET AL 2,591,918
VOLTAGE-REGULATED ELECTRICAL POWER SUPPLY
Filed Oct. 15, 1949 2 SHEETS—SHEET 2

BYRON M. COLE.
FREDERIK KERKHOF
INVENTORS.

BY

AGENT.

Patented Apr. 8, 1952

2,591,918

UNITED STATES PATENT OFFICE 2,591,918

VOLTAGE-REGULATED ELECTRICAL POWER SUPPLY

Byron M. Cole, Ossining, N. Y., and Frederik Kerkhof, Eindhoven, Netherlands, assignors to Philips Laboratories, Inc., Irvington on Hudson, N. Y.

Application October 15, 1949, Serial No. 121,518

8 Claims. (Cl. 315—19)

The present invention relates to voltage-regulated, electrical power supplies, and more particularly to regulated, high voltage, power supplies for television purposes.

For many purposes, such as the operation of a cathode ray tube in a television receiver, it is necessary to have a high voltage-low current source of direct-current power. It is desirable for many applications that the voltage output of the source remain constant over relatively large variations in load current.

The principal objects of the present invention are to provide an improved and efficient system for supplying high voltage direct-current power and to provide an accurate, simple and easily adjustable arrangement for closely regulating the voltage output of a power supply.

Further objects of the invention will appear from the following description.

According to the invention, these objects are achieved by means of an interruption type power supply in which the current through an inductance is cyclically interrupted by a discharge tube to the control grid of which there are applied the negative peaks of a square wave having a variable duration. The square wave is provided by a suitable generator to which is applied a control voltage proportional to the load current and which control voltage varies the duration of the negative peak of the square wave pulse inversely proportional to the load current. In the preferred arrangement of the invention, the square wave generator is actuated by pulses derived from the synchronizing signals of the television receiver.

Figure 1:
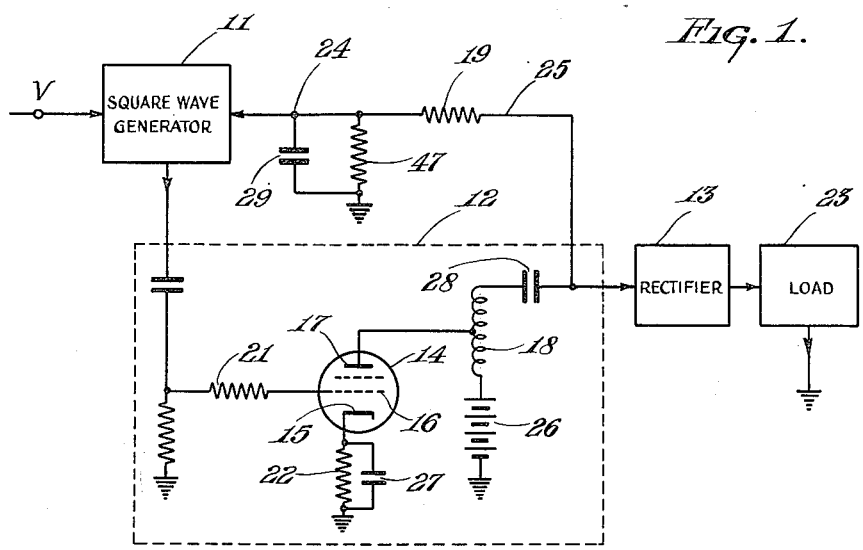
Figure 2:
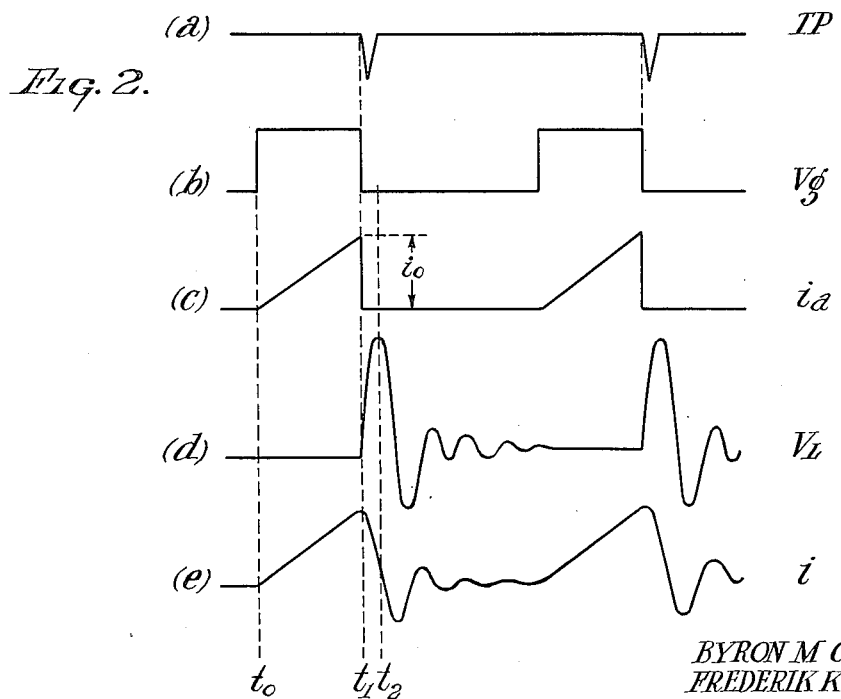
Figure 3:
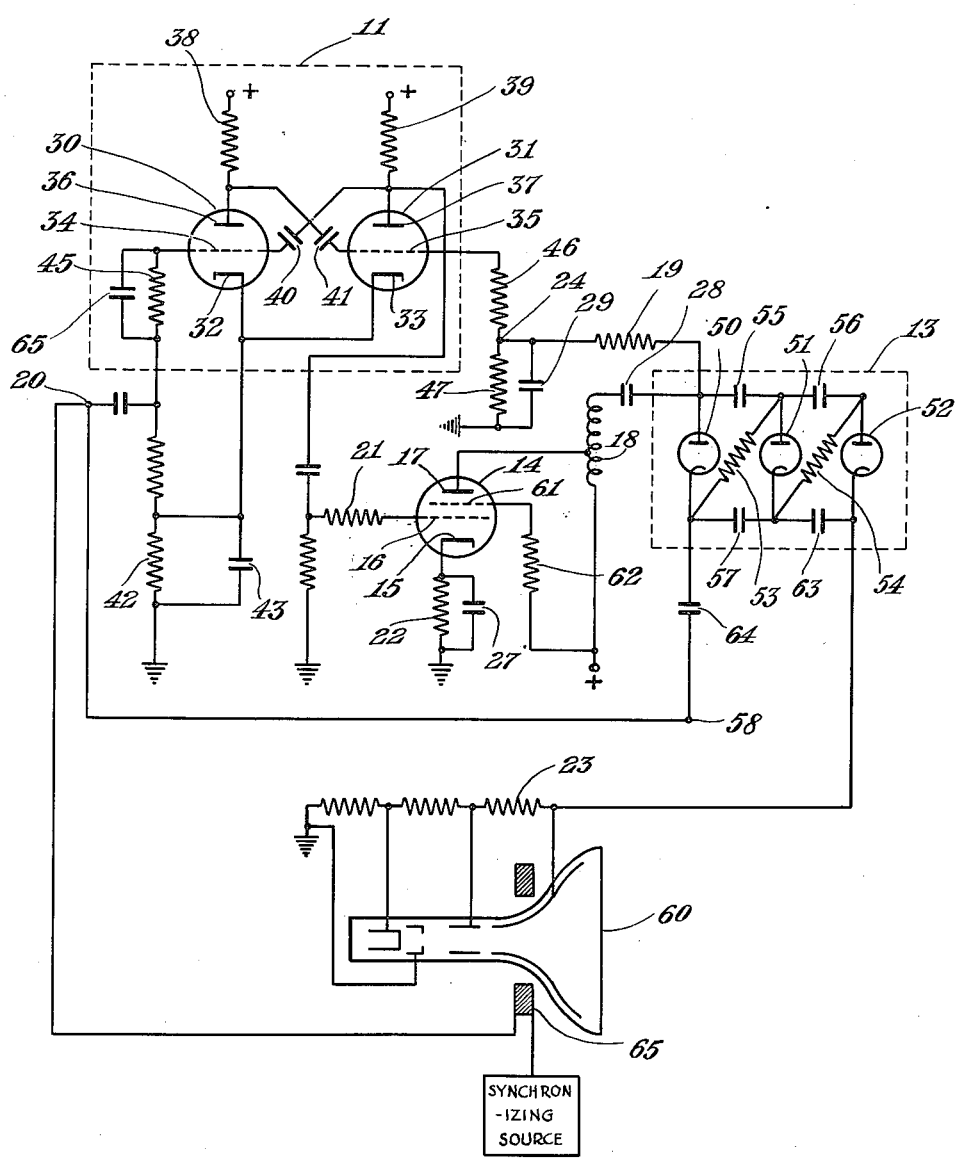

The invention will be described in greater detail with reference to the appended drawing in which:

Figure 1 is a schematic diagram of a circuit arrangement, in accordance with the invention, for supplying regulated high voltage power to a load, Figure 2 is a set of curves illustrating the operation of the circuit of Figure 1, and Figure 3 is a more detailed schematic diagram of the embodiment of the invention shown in Figure 1.

Referring now to the drawing and more particularly to Fig. 1, there is shown the basic elements of the voltage regulated supply, comprising a square wave generator 11, a surge producing circuit 12 and a rectifier 13. The square wave generator 11 will be described in greater detail with reference to Fig. 3, and a feature thereof is that it produces square waves having negative peaks, the duration of which is proportional to the amplitude of a control voltage applied thereto. Surge producing circuit 12 includes a discharge tube 14, having a cathode 15, a control grid 16 and an anode 17. A tapped inductance coil 18 is connected in series with an anode voltage battery 26, the tap on coil 18 being connected to anode 17. The output of generator 11 is fed to grid 16 through current limiting resistor 21. Bias for tube 14 is provided by means of a resistor 22 in the cathode circuit, which resistor is suitably bypassed by a capacitor 27.

As shown in Fig. 3 the tube 14 comprises a screen grid 61 which is coupled to a positive source of direct current voltage through a dropping resistor 62 and is preferably unbypassed to prevent the flow of an excessive screen grid current during the positive grid pulses.

One terminal of rectifier 13 is coupled to inductor 18 through capacitor 28, the other terminal thereof being coupled to ground through a load 23, which may be, for example, the accelerating electrode system of a cathode ray tube. The return path to the rectifier 13 for the direct current flowing through load 23 is constituted by ground and a network formed by a series connection of resistors 47 and 19 which are connected between ground and the junction of capacitor 28 and rectifier 13. Load current flowing through resistor 47 produces a voltage drop thereacross which is applied as a control voltage to square wave generator 11. Resistor 47 is by-passed for alternating currents by a capacitor 29.

Square wave generator 11 is periodically triggered by a negative synchronizing pulse applied to an input terminal 20. The negative triggering pulses, shown in curve (a) of Fig. 2 are preferably derived from a source such as the horizontal deflection coil of a cathode ray tube. When generator 11 is triggered by a triggering pulse, a negative square wave pulse is produced at the output of the generator. The negative square wave pulse is followed by a positive square wave pulse which continues until the succeeding triggering pulse produces a negative square wave pulse in the output of the generator 11. The output of generator 11 may be considered as a succession of positive and negative square wave pulses, as shown in curve (b) of Fig. 2. The relative duration of positive and negative square wave pulses is dependent on the magnitude of the control voltage applied to generator 11 from a point 24, which is the terminal of resistor 47 remote from ground.

When a positive output pulse from generator 11 is applied to grid 16, the anode current of tube 14 tends to rise sharply, the rate of rise being limited by the inductance of coil 18. The anode current waveform will exhibit an approximately saw-tooth shape, as shown in curve (c) of Fig. 2.

When generator 11 is triggered by a negative triggering pulse, a negative square wave output pulse is produced and applied to grid 16, causing a rapid extinction of anode current in tube 14. The leading edge of the negative square wave pulses may be considered as the trailing edge of the preceding positive pulses. The relative duration of the positive and negative square wave pulses will determine the maximum value $i_0$ to which the anode current $i_a$ of tube 14 will rise before cutoff. For example, increasing the negative square wave pulse duration will decrease the positive pulse duration and produce earlier cutoff of the anode current in tube 14.

At the time the rise of anode current is interrupted, substantial magnetic energy will be stored in inductance coil 18. This energy will be approximately equal to $\frac{1}{2} L i_0^2$, where L is the inductance of coil 18 and $i_0$ is the maximum value of anode current $i_a$. After interruption of anode current at time $t_1$, the magnetic energy stored in the inductance 18 produces an oscillatory voltage across the inductance and its inherent distributed capacity, which form a parallel resonant circuit tuned to a frequency much greater than the repetition rate of the negative triggering pulses. Additional capacity may be connected in parallel with coil 18 if desired. Because of the sudden interruption of anode current through coil 18, a high intensity oscillatory voltage shown as $V_L$ in curve (d) of Fig. 2, will be produced across the inductance 18. The current $i$, flowing through coil 18, is shown in curve (e).

Voltage $V_L$ is applied to rectifier 13 and supplied to a load 23, causing a current to flow through load 23 and resistance elements 47 and 19. As has been pointed out hereinbefore, load current flowing through resistor 47 produces a voltage drop thereacross, causing the potential of point 24 with respect to ground to vary proportional to the magnitude of the load current. This potential is applied as a control voltage to square wave generator 11.

Assuming that the load current increases, due for example to an increase in the brightness of the image of the cathode ray tube of the television receiver, the load voltage will tend to decrease and the potential of point 24 with respect to ground will tend to increase negatively. The control voltage will therefore become more negative and will tend to decrease the duration of the negative square wave pulses applied to the grid 16 of tube 14. As a result, the positive square wave pulse duration will be longer and tube 14 will conduct for a longer period, allowing a higher maximum anode current $i_0$ to be achieved before a negative square wave pulse causes the anode current of tube 14 to cutoff. A higher value of $i_0$ will, in turn, result in a higher oscillatory voltage and a higher rectified voltage, thereby counteracting the reduction in load voltage caused by the increase in load.

Similarly, a decrease in load current will increase the load voltage and raise the potential of point 24 closer to ground, decreasing the control voltage and increasing the duration of the negative square wave, decreasing the value of maximum anode current $i_0$. A lower value of $i_0$ will, in turn, result in a lower oscillatory voltage and rectified voltage, thereby counteracting the increase in load voltage caused by a reduction in load.

Referring now to Fig. 3, there is shown a more detailed circuit arrangement in accordance with the invention. Elements in Fig. 3 corresponding with elements in Fig. 1 are designated by the same reference numerals. The operation of the circuit shown in Fig. 3 is substantially the same as that of Fig. 1.

Square wave generator 11 is constituted by a driven plate-coupled multivibrator including tubes 30 and 31, having cathodes 32 and 33, control grids 34 and 35 and anodes 36 and 37 respectively. Anodes 36 and 37 are connected to a source of positive direct-current potential through load resistors 38 and 39 respectively. The control grid 34 of tube 30 is coupled to the anode 37 of tube 31 through capacitor 40 and the control grid 35 of tube 31 is coupled to the anode 36 of tube 30 through capacitor 41. Cathodes 32 and 33 are connected together and coupled to ground through a resistor 42 and a by-pass capacitor 43.

Negative triggering pulses are applied to terminal 20, which is coupled to grid 34 through a capacitor 65 and a resistor 45. The negative triggering pulses may be derived, for example, from a cathode ray tube horizontal deflection coil 65, as shown in Fig. 3.

By reason of the common cathode resistor and the facts that the grid of tube 30 is returned to the common cathode through a grid leak 45, and the grid of tube 31 is returned to ground through the resistor 47, the tube 30 is normally conductive, while tube 31 is normally biased to cut off. A negative triggering pulse applied to grid 34 of tube 30 produces a momentary decrease in tube current which in turn causes a positive voltage peak at the anode 36 which is applied to grid 35 of tube 31 through capacitor 41 and renders tube 31 conductive. The positive peak of voltage at grid 35 is amplified by tube 31, applied to grid 34 through capacitor 40, amplified again by tube 30 and applied again to grid 35 of tube 31. This constitutes a regenerative switching process which continues until tube 31 is fully conducting and tube 30 cut off. When the positive charge on condenser 41 decays sufficiently, causing the current of tube 31 to decrease, a reverse switching process occurs, rendering tube 30 conducting and tube 31 non-conducting. When tube 31 is non-conducting, its anode voltage is high. When conducting, the voltage drop through resistor 39 causes the anode voltage of tube 31 to be low. These variations are repeated at grid 16 of tube 14 in the form of positive and negative square wave pulses. The relative duration of conduction and non-conduction periods of tube 31 and hence the relative duration of the negative and positive square wave pulses at grid 16 are varied by varying the control voltage applied to grid 35 of tube 31 across resistor 47. A lower negative control voltage will cause tube 31 to conduct for a longer time, thereby lengthening the period during which the anode voltage thereof is low. The magnitude of this control voltage varies in accordance with fluctuations of current flowing through load resistor 23 and cathode ray tube 60.

As discussed hereinbefore in connection with Fig. 1, an increase in load current produces an increase in negative control voltage which shortens the conduction period of tube 31. As a result, the negative portion of the square wave output is shortened in duration, allowing the maximum anode current $i_0$ of tube 14 to achieve a greater value, thereby increasing the oscillatory voltage across inductance coil 18 and compensating for the reduction in load voltage caused by the increased load current. A decrease in load current produces a decrease in negative control voltage thereby increasing the duration of the negative pulses produced by the generator 11.

Since the direct voltage developed at point 24 is dependent on the magnitude of resistor 47 the voltage regulation of the power supply may be given a rising, level or falling characteristic by adjusting the value of the resistor 47.

An important feature of the circuit arrangement above described is that no oscillatory voltage will be produced in the absence of triggering pulses for generator 11, for it is the triggering pulses that cause the negative square wave pulses which, in turn, cutoff tube 14 and produce an oscillatory voltage. As a result, the cathode ray tube screen will be protected from burning out by cutting off the high voltage in the absence of deflecting voltages.

Rectifier 13 is shown, in Fig. 3, as a voltage tripling circuit constituted by diodes 50, 51 and 52 connected in series for direct currents by resistors 53 and 54. The anodes of diodes 50 and 51 are coupled by capacitor 55; the anodes of diodes 51 and 52 are coupled by capacitor 56; the cathodes of diodes 50 and 51 are coupled by capacitor 57; and the cathodes of diodes 51 and 52 are coupled by capacitor 63. Capacitor 64 is coupled between the cathode of diode 50 and terminal 20. Voltage tripling action occurs because the charges acquired by capacitors 57, 63 and 64 are combined additively.

The load circuit in Fig. 3 is shown as cathode ray tube 60 connected between the cathode of diode 52 and ground and a tapped resistor 23 for providing intermediate voltages for the cathode ray tube electrode system.

Point 58, the terminal of capacitor 64 which is remote from the cathode of diode 50, may be connected to ground. It is, however, shown in Fig. 3 as connected to terminal 20. This connection produces a higher output voltage by lowering the potential of the cathode of diode 50 with respect to ground at each application of a negative triggering pulse to terminal 20.

While we have described our invention in a specific use thereof and in specific embodiments, we do not wish to be limited thereto, for obvious modifications will occur to those skilled in the art without departing from the spirit and scope of the invention.

What is claimed is:

1. A voltage-regulated direct-current power source for supplying a load, comprising an electron discharge tube having a cathode, a control grid and an anode, an oscillatory network comprising an inductive element, means to energize said anode through said inductive element, a square wave voltage generator for producing successive pulses having a duration proportional to the magnitude of a control voltage applied to said generator, means to apply the output pulses of said square wave generator to said control electrode to alternately increase and decrease conduction to the anode of said tube and to produce an oscillatory voltage across said network during decreased conduction periods, said network being coupled to said load, means to produce a control voltage proportional to current flow through said load, and means to apply said control voltage to said square wave generator to vary the relative durations of said periods of increased and decreased conduction proportional to the amplitude of said control voltage.

2. A voltage-regulated direct-current power source for supplying a load, comprising an electron discharge tube having a cathode, a control grid and an anode, an oscillatory network comprising an inductive element having a tapping, means to connect said anode to said tapping, means to energize said anode through said inductive element, a square wave voltage generator for producing successive pulses having a duration proportional to the magnitude of a control voltage applied to said generator, means to apply the output pulses of said square wave generator to said control electrode to alternately increase and decrease conduction to the anode of said tube and to produce an oscillatory voltage across said network during decreased conduction periods, said network being coupled to said load, means to produce a control voltage proportional to current flow through said load, and means to apply said control voltage to said square wave generator to vary the relative durations of said periods of increased and decreased conduction proportional to the amplitude of said control voltage.

3. A voltage-regulated direct-current power source for supplying a load, comprising an electron discharge tube having a cathode, a control grid and an anode, an oscillatory network comprising an inductive element, means to energize said anode through said inductive element, a square wave voltage generator for producing successive pulses having a duration proportional to the magnitude of a control voltage applied to said generator, means to periodically trigger said square wave generator, means to apply the output pulses of said square wave generator to said control electrode to alternately increase and decrease conduction to the anode of said tube and to produce an oscillatory voltage across said network during decreased conduction periods, said network being coupled to said load, means to produce a control voltage proportional to current flow through said load, and means to apply said control voltage to said square wave generator to vary the relative durations of said periods of increased and decreased conduction proportional to the amplitude of said control voltage.

4. A voltage-regulated direct-current power source for supplying a load, comprising an electron discharge tube having a cathode, a control grid and an anode, an oscillatory network having a given resonant frequency and comprising an inductive element, means to energize said anode through said inductive element, a square wave voltage generator for producing successive pulses having a duration proportional to the magnitude of a control voltage applied to said generator, means to periodically trigger said square wave generator at a rate lower than the resonant frequency of said network, means to apply the output pulses of said square wave generator to said control electrode to alternately increase and decrease conduction to the anode of said tube and to produce an oscillatory voltage across said network during decreased conduction periods, said network being coupled to said load, means to produce a control voltage proportional to current flow through said load, and means to apply said control voltage to said square wave generator to vary the relative durations of said periods of increased and decreased conduction proportional to the amplitude of said control voltage.

5. A voltage-regulated direct-current power source for supplying a load, comprising an electron discharge tube having a cathode, a control grid and an anode, an oscillatory network having a given resonant frequency and comprising an inductive element, means to energize said anode through said inductive element, a square wave voltage generator for producing successive pulses having a duration proportional to the magnitude of a control voltage applied to said generator, means to periodically trigger said square wave generator, means to apply the output pulses of said square wave generator to said control electrode to alternately increase and prevent conduction to the anode of said tube and to produce an oscillatory voltage across said network while conduction to said anode is prevented, said network being coupled to said load, means to produce a control voltage proportional to current flow through said load, and means to apply said control voltage to said square wave generator to vary the relative durations of said periods of increased and prevented conduction proportional to the amplitude of said control voltage.

6. A voltage-regulated direct-current power source for supplying a load, comprising a first electron discharge tube having a cathode, a control grid and an anode, an oscillatory network comprising an inductive element, means to energize said anode through said inductive element, a square wave voltage generator for producing successive pulses having a duration proportional to the magnitude of a control voltage applied to said generator comprising second and third discharge tubes each having cathode, grid and anode electrodes, said second tube being normally conducting and said third tube being normally non-conducting, means to capacitively couple the anode of said second tube to the grid of said first tube, means to capacitively couple the anode of said third tube to the grid of said second tube, means to couple together the cathodes of said second and third tubes and means to couple the anodes of said second and third tubes to a source of positive potential, means to periodically apply a negative voltage pulse to the grid of said second tube to trigger said square wave generator, means to couple the anode of said third tube to the control grid of said first tube to alternately increase and decrease conduction to the anode of said first tube and to produce an oscillatory voltage across said network during decreased conduction periods of said first tube, said network being coupled to said load, means to produce a control voltage proportional to current flow through said load, and means to apply said control voltage to the grid of said third tube to vary the relative durations of said periods of increased and decreased conduction proportional to the amplitude of said control voltage.

7. A voltage-regulated direct-current power source for supplying direct-current to the electrodes of a cathode ray tube having a deflection coil, comprising an electron discharge tube having a cathode, a control grid and an anode, an oscillatory network comprising an inductive element, means to energize said anode through said inductive element, a square wave voltage generator for producing successive pulses having a duration proportional to the magnitude of a control voltage applied to said generator, means to derive a triggering voltage pulse from the deflection coil of said cathode ray tube, means to apply said triggering pulse to said square wave generator to periodically trigger said square wave generator, means to apply the output pulses of said square wave generator to said control electrode to alternately increase and decrease conduction to the anode of said tube and to produce an oscillatory voltage across said network during decreased conduction periods, means coupled to said inductance to rectify said oscillatory voltage and to apply said rectified voltage to the electrodes of said cathode ray tube, means to produce a control voltage proportional to current flow through said cathode ray tube and means to apply said control voltage to said square wave generator to vary the relative durations of said periods of increased and decreased conduction proportional to the amplitude of said control voltage.

8. A voltage-regulated direct-current power source for supplying a load, comprising an electron discharge tube having a cathode, a control grid and an anode, an oscillatory network comprising an inductive element, means to energize said anode through said inductive element, a square wave voltage generator for producing successive pulses having a duration proportional to the magnitude of a control voltage applied to said generator, means to apply the output pulses of said square wave generator to said control electrode to alternately increase and decrease conduction to the anode of said tube and to produce an oscillatory voltage across said network during decreased conduction periods, said network being coupled to said load, means to produce a control voltage proportional to current flow through said load, and means to apply said control voltage to said square wave generator to vary the relative durations of said periods of increased and decreased conduction proportional to the amplitude of said control voltage.

BYRON M. COLE.
FREDERIK KERKHOF.

REFERENCES CITED

The following references are of record in the file of this patent:

UNITED STATES PATENTS

| Number | Name | Date |
|---|---|---|
| 2,272,794 | Kramolink | Feb. 10, 1942 |
| 2,302,900 | Vance | Nov. 24, 1942 |
| 2,306,888 | Knick | Dec. 29, 1942 |
| 2,373,165 | Cawein | Apr. 10, 1945 |
| 2,397,150 | Lyman | Mar. 26, 1946 |
| 2,419,527 | Bartelink | Apr. 29, 1947 |
| 2,426,996 | Goodall | Sept. 9, 1947 |